ically*# United States Patent
Derham, deceased et al.

[15] 3,650,730

[45] Mar. 21, 1972

[54] PURIFICATION OF ALUMINIUM

[72] Inventors: Leslie Jack Derham, deceased, late of Avonmouth Works, Avonmouth, England; Michael Gordon Derham, administrator, Henleaze, Bristol, England

[73] Assignee: Alloys and Chemicals Corporation, Cleveland, Ohio

[22] Filed: Mar. 21, 1969

[21] Appl. No.: 810,086

[30] Foreign Application Priority Data

Mar. 21, 1968 Great Britain......................13,643/68

[52] U.S. Cl............................................75/68, 75/93, 75/94
[51] Int. Cl....................C22b 21/06, C22b 9/10, C22b 9/12
[58] Field of Search.........................................75/68, 93, 94

[56] References Cited

UNITED STATES PATENTS

| 1,848,797 | 3/1932 | Pacz | 75/68 |
| 1,950,967 | 3/1934 | Bonsack | 75/68 |
| 2,056,233 | 10/1936 | Stroup | 75/68 |
| 2,195,217 | 3/1940 | Lindenberger et al. | 75/68 |
| 2,840,463 | 6/1958 | Stroup et al. | 75/68 |
| 3,025,154 | 3/1962 | Kurfman | 75/68 X |

FOREIGN PATENTS OR APPLICATIONS

| 562,590 | 9/1958 | Canada | 75/68 |
| 981,795 | 1/1965 | Great Britain | 75/68 |

*Primary Examiner*—L. Dewayne Rutledge
*Assistant Examiner*—G. K. White
*Attorney*—Lane, Aitken, Dunner & Ziems

[57] ABSTRACT

A process for removing impurities from aluminum or aluminum alloys comprising treating the molten metal with a chloridizing agent while the metal is covered with a layer of molten flux, so as to suppress the emission of fumes from the molten metal. An improved aspect of such process wherein the flux contains at least part of the chloridizing agent.

15 Claims, 7 Drawing Figures

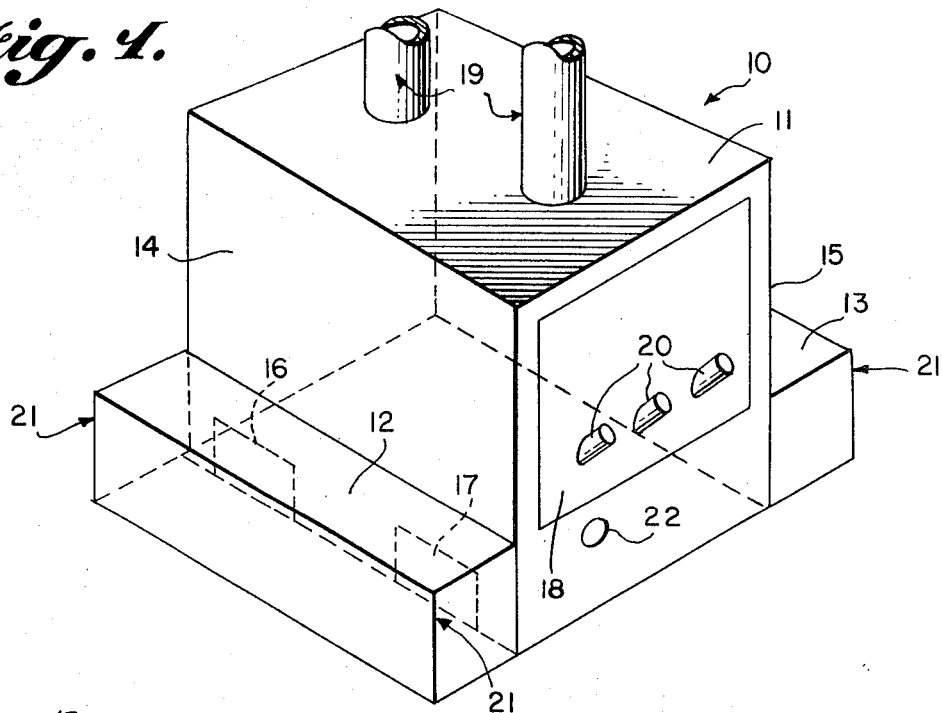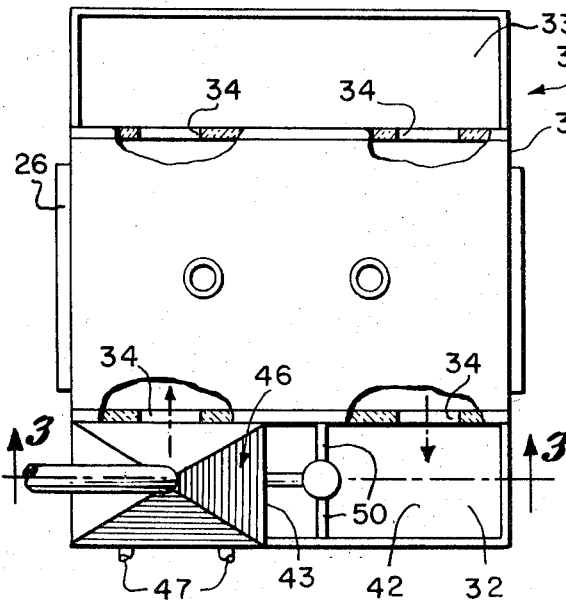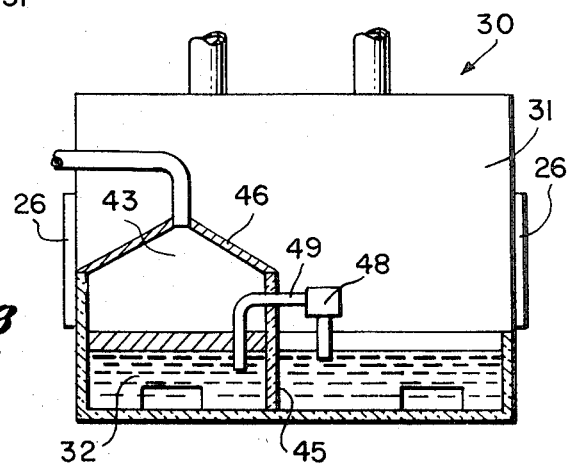

Patented March 21, 1972 3,650,730

INVENTOR
LESLIE JACK DERHAM

BY Lane, Aitken, Dunner & Ziems
ATTORNEYS

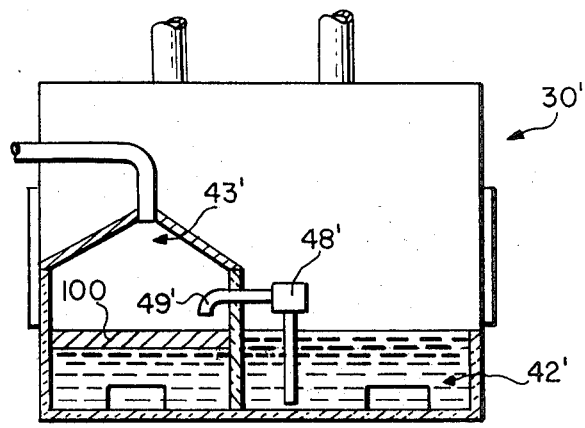
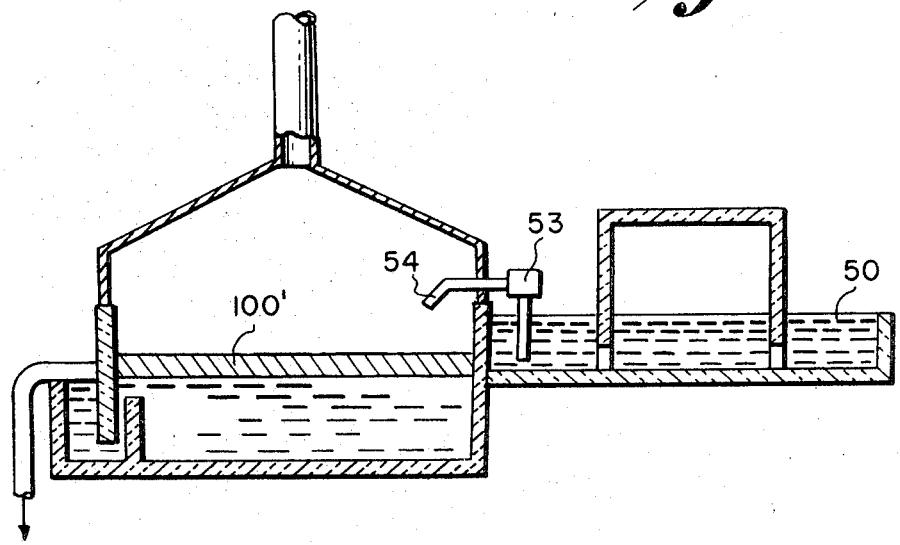

PURIFICATION OF ALUMINIUM

This invention relates to methods of purifying aluminum, and more particularly, to the removal of certain impurities by the action of chlorine or certain chlorides.

The term "aluminum" as used hereafter refers to aluminum and to alloys containing aluminum as the major component.

The aluminum metal in commercial use derives from two possible sources: it is either virgin aluminum derived from smelting bauxite, known as primary aluminum or metal obtained by scrap recovery from many sources, and known as secondary aluminum.

In both cases, the metal before it can be used for fabrication purposes has to be refined. Oxide forms dross, but hydrogen dissolves in the metal, its solubility increasing with temperature. Unless removed, this dissolved gas on cooling causes flaws in the final cast products. Another the major problem is impurity elements, particularly magnesium, which either have to be wholly removed (such as in the case of sodium), or at least removed down to a predetermined level.

One method used to remove these contaminants, both in primary smelting processes and in scrap metal recovery processes, is to treat the aluminum while molten with a reactive chlorine-containing vapor. This process has been referred to as "chloridizing aluminum". By this process, impurity metals and hydrogen are removed. Magnesium and sodium are converted to their chlorides and thus can be removed from the surface of the molten metal in this form as a dross.

The term "reactive chlorine-containing vapor" as used hereafter includes both chlorine gas and other gaseous chlorine compounds including chlorinated hydrocarbons. However, these gaseous materials must not be such that other contaminants are thereby introduced into the bath. Thus, among those suitable are aluminum chloride and chlorinated hydrocarbons; but in general the source used is gaseous chlorine, which is relatively cheap and easy to handle.

Generally, this treatment of the aluminum is carried out by bubbling the chlorine gas (or other chlorine-containing vapor) into the molten metal while held in a melting or holding furnace or in a ladle. Chemical reaction between the molten metal and the chlorine ensues, and chlorides are formed which rise to the surface of the metal as a dross, consisting for example, of magnesium and sodium chlorides, trapped particles of aluminum, and aluminum oxides. One disadvantage of this process is that the efficiency of chlorine utilization is low. Further, during treatment, appreciable quantities of aluminum are lost from the molten bath as aluminum chloride. The excess of chlorine which has to be used results in two problems.

A part of the chlorine is lost as aluminum chloride. This hydrolyses on contact with atmospheric water and produces hydrochloric acid and a fume of extremely finely divided aluminum hydroxide or oxide. These two together constitute a formidable air pollution problem. For although the acid can be fairly effectively removed by a suitable water scrubbing system in the gas offtake, the alumina dust is of so small particle size—below 2 microns—that its removal is extremely difficult.

Secondly, gaseous chlorine is lost from the melt: this can only be removed from the stack gasses by some form of reactive system.

It has been discovered that this fume can be largely suppressed; it is thus an object of this invention to provide an improved method for chloridizing aluminum.

It is a further object of this invention largely to suppress the emission of aluminum chloride fume from the surface of the molten aluminum during chloridization.

It is still a further object of this invention to suppress the emission of fumes from the surface of the molten aluminum during chloridization by means of a layer of flux which also serves to provide at least part of the chloridizing agent.

BRIEF DESCRIPTION OF THE DRAWINGS

FIG. 1 is a perspective view of a furnace useful in illustrating the process of the instant invention;

FIG. 2 is a top plan view of a circulatory type furnace useful in illustrating the process of the instant invention;

FIG. 3 is a vertical sectional view taken along line 3—3 of FIG. 2;

FIG. 6 is a vertical sectional view similar to that of FIG. 3 but of an alternative embodiment of the instant invention; and, FIG. 7 is a transverse sectional view similar to that of FIG. 4 but of another alternative embodiment of the instant invention.

Figure 4:
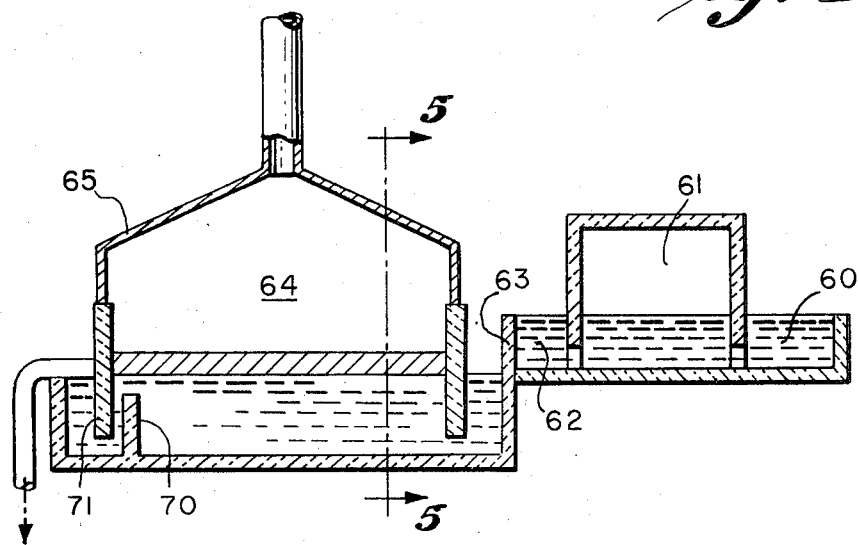
FIG. 4 is a transverse sectional view of a third furnace useful in illustrating a modification of the process of the instant invention.

In one embodiment of this invention, a reactive chlorine-containing vapor is passed into the flux-covered metal to serve as the chloridizing agent. In still another embodiment of this invention to be described at a later point of this specification, the flux itself contains part or all of the chloridizing agent required to remove the impurities from the molten aluminum. In the latter embodiment, the chloridizing agent in the flux can be supplemented with a reactive chlorine-containing vapor.

EMBODIMENT IN WHICH A REACTIVE CHLORINE-CONTAINING VAPOR IS PASSED INTO FLUX-COVERED METAL TO SERVE AS CHLORIDIZING AGENT

The flux used in this invention must meet certain important criteria. Firstly, it shall be adequately fluid at the temperature at which chlorination is carried out. This generally is in the region of 700°–750° C. Secondly, it shall be capable of absorbing within itself at least the major part of the aluminum chloride formed during the chlorination. Thirdly, no impurity metals shall be transferred into the aluminum from the flux.

The materials that we have found to fulfill these criteria best are the chlorides and fluorides of the alkali and alkaline earth metals. These compounds, particularly the chlorides, form double salts with aluminum chloride, some of which have the following melting points:

| | | |
|---|---|---|
| $NaAlCl_4$ | mp: | 154° C. |
| $KAlCl_4$ | mp: | 245° C. |
| $LiAlCl_4$ | mp: | 142° C. |
| $MgCl_2 \cdot 2AlCl_3$ | mp: | 301° C. |
| $NH_4AlCl_4$ | mp: | 227° C. |

(Source: W. Schmidt, U.S. Pat. No. 3,240,590)

To such materials can also be added ammonium chlorides and fluorides. Corresponding fluorides are also known to exist and are intended as part of the invention.

The solubility of the fluorides in mixed chloride systems is markedly temperature dependent: thus addition of these can be used to "stiffen up" a too fluid chloride mixture. For example, it is not advisable to add more than about 2 percent of cryolite, $Na_3AlF_6$, to the double salt $NaCl \cdot AlCl_3$ if the mix is to be used at about 720° C. The flux can generally be prepared by mixing together the dry components: for example, the KCl-NaCl-cryolite flux used in the Examples. Alternatively, the flux can be made by using a binary mixture such as NaCl-$NaAlCl_4$. These double salts are prepared by simple fusion techniques: the procedure given below for sodium aluminum chloride is typical. In this manner, by suitable combination of materials, a fluid flux can be prepared. Once the flux is in use, fluidity and melting point can both be easily controlled, e.g., as follows:

a. to make more fluid: deliberately use too much chlorine, and allow some $AlCl_3$ to pass into the flux forming the low-melting double salt.

b. to stiffen up: add more chlorides.

During the chloridization, the impurity metals removed, primarily magnesium, will accumulate in the flux in the form of chlorides: thus the quantity of flux steadily increases. Periodically some will have to be removed. Further, it appears that the alkali metal chlorides retain aluminum chloride better than the alkaline earth chlorides: hence we prefer to maintain the quantity of these in the flux by adding fresh materials. For example, the following form of operation is recommended:

| | | |
|---|---|---|
| Initial flux wt.: | 1,000 lbs. | |
| Initial flux composition: | KCl | 45% |
| | NaCl | 50% |
| | Na₃AlF₆ | 5% |
| Limiting flux wt. retainable in furnace: | | 2,000 lbs. |
| Hence MgCl₂ absorbable: | 1,000 lbs. | |
| wt. flux removed: | 1,250 lbs. | |
| wt. NaCl added: | 250 lbs. | |

A given sample of flux does not have an infinite life, however,. In time it will stiffen up due to oxidic dross accumulation, and a fluid condition can no longer then be maintained. The period of time needed to do this is an imponderable factor, dependent very largely on the actual operation conditions pertaining to a specific furnace.

In operating the process of this invention, the chlorination can be carried out as a batchwise procedure in a very similar manner to that which has been done heretofore. A direct comparison, using the same aluminum alloy feed, of the old process and that of this invention is given in Examples 3 and 4. Alternatively, the process can be carried out in a circulatory furnace, as described in Example 5. This method has, over that of Example 4, the advantages that far less flux is used, and, the process can be completed more quickly. Furthermore, as described in Example 6, the process of this invention can be carried out continuously.

Continuous operation of a chlorination procedure has not been operated hitherto, and in particular offers considerable advantages in refining primary aluminum. The major purpose in the primary field of the chlorination is to degas the metal. By carrying out this degassing under a flux cover using chlorine, better quality castings, are obtained.

The invention will now be further described with reference to the following non-limiting Examples.

EXAMPLE 1

Preparation of the double salt NaCl.AlCl₃.

Materials.

It is of prime importance that both components be dry: if either is at all wet alumina and HCl are formed in the flux, which is undesirable. Sodium chloride generally is dry, but if it has caked, it can be dried by simply powdering and heating in an oven at about 120° C. In the case of aluminum chloride, water causes hydrolysis to alumina and HCl: if not properly sealed during storage this can happen. Purification is best effected by distillation.

Method.

The two dry salts were mixed in a weight ratio of 3 parts sodium chloride to 7 parts aluminum chloride, and added to a bottom-heated pot maintained at an internal temperature of 300° C. Very quickly a liquid pool was formed; to this pool, further mixture was added at such a rate that a liquid condition was maintained throughout.

To this can be added further sodium chloride: this will not dissolve, but remain suspended in the liquid, which thus becomes less fluid. Addition of excess sodium chloride must not be taken to the point where the flux becomes so stiff as not to be fluid enough. As a guide, its melting point should not be allowed to rise above 675° C.

EXAMPLE 2

Indirect preparation of a reactive flux.

To 1,000 kg. of molten aluminum in a crucible maintained at 710°–730° C. was added 1,900 kg. of a flux of the following composition:

| Material | Parts by Weight |
|---|---|
| NaCl | 50 |
| KCl | 45 |
| Cryolite | 5 |

When the flux had melted, chlorine gas was passed into the metal, and most of it converted to aluminum chloride. Over a period of 3 hours a total weight of 2,960 kg. of chlorine was passed into the metal. The flux thus obtained has the following approximate composition:

| | | |
|---|---|---|
| NaCl | : | 950 kg. |
| KCl | : | 855 kg. |
| Cryolite | : | 95 kg. |
| AlCl₃ | : | 3,710 kg. |

In the following Examples of the process, reference is made to the Figures of the drawings. It is to be understood that the drawings are useful to illustrate the inventive process and the furnaces shown are not part of the invention; accordingly, various working details, such as charge door operating mechanisms, are not shown. Particularly the details of the refractory linings and the gas heating burners are not shown; both are normal to metallurgical practice.

It is also to be understood that the melting part of the furnace shown in the figures of the drawings do not have to be internally fired with natural gas burners as described in the following examples. Any convenient source of heat, either direct or indirect, could be used; for example, electricity.

EXAMPLES 3 and 4

In these Examples, direct comparison of the old process, Example 3, is made with the simplest form of the process of this invention, Example 4. In both cases it is applied to an aluminum-silicon alloy, containing 11 percent silicon. The furnace used is that shown in FIG. 1 and is indicated by reference numeral 10. Furnace 10 consists of a heated chamber 11, with wells 12 and 13 on walls 14 and 15, respectively, which communicate with the main heating chamber through the apertures 16 and 17 in wall 14; similar apertures, not shown, are in wall 15. Two apertures are shown; for a large furnace three or even four can be used. The size of these apertures, particularly their height, is determined by the amount of metal left in the furnace—known as the "heel"—between batches. Generally, it is not so high that it is not covered by the heel alone. The furnace is also provided with an access door 18, and offtake stacks 19. Through the door 18, or through any other convenient place, for example along the side of a single well furnace, are provided chlorine lance holes 20. The lances (not shown) are of carbon, and are connected to the chlorine source by suitable pipework (also not shown).

In operation, the furnace is heated and the heel melted. Further metal is then added into wells 12 and 13, and melted by contact with the molten metal present. Addition is stopped when the furnace is fully charged. The metal level will then be in the region of arrow 21. During this process, and the chlorination process, the metal melt is maintained at a temperature of 710°–750° C by suitable control equipment. When all the metal is in, the furnace is stirred, generally by means of a manually operated rake or paddle (not shown), and metal samples taken for analysis. On the basis of these, chlorine requirements are calculated.

After chlorination, the metal is removed through a simple tap hole 22, generally sited below the access door. Following are the data for Examples 3 and 4:

| | | Example 3 | Example 4 |
|---|---|---|---|
| Metal | | Al/Si Alloy | Al/Si Alloy |
| | | Si : 11% | Si : 11% |
| Furnace: | | | |
| | Capacity | 29,600 kg. | 29,600 kg. |
| | working charge | 18,200 kg. | 18,200 kg. |
| | heel | 11,400 kg. | 11,400 kg. |
| Chlorination temperature: | | 710°–750° C. | 710°–750° C. |
| Magnesium: | | | |
| | in total charge 0.86% | | 0.86% |
| | in metal tapped less than 0.1% | | less than 0.1% |

| | | |
|---|---|---|
| Theoretical chlorine required: | 710 kg. | 710 kg. |
| Chlorine used: | 2,090 kg. (during 2.5 hours, one lance) | 780 kg. |
| Flux: depth | Nil | 15 cm. |
| composition (parts by weight) | | NaCl: 50 KCl:45 Na$_3$AlF$_6$:5 |
| melting point | | 660° C. |
| Losses: | | |
| excess chlorine used: | 1,380 kg. | 70 kg.** |
| HCl generated | 1,420 kg. | approx 19 kg. |
| Aluminum lost | 310 kg. | |
| (as Alumina dust) | approx 620 kg. | |
| AlCl$_3$ retained in flux | — | approx 94 kg. |

*i.e., % MG in the total 29,600 kg. present ; in feed metal: ca 1.4%

**Feed rate adjusted so that no chlorine breakout through the flux occurred.

EXAMPLE 5

In this Example, a circulatory type of furnace, as shown in FIGS. 2 and 3, was used. Comparison of FIG. 1 with FIGS. 2 and 3 shows that this is a modified form of the original furnace. The advantages of this furnace are threefold:

a. a much smaller void volume has to be made gas tight.
b. a much smaller amount of flux is needed.
c. chlorination can be carried out as soon as the metal level is a reasonable distance above the transfer apertures.

Furnace 30 consists of a melting chamber 31, with feed wells 32 and 33 on each side, communicating with the main chamber 30 through ports 34. Well 32 is modified in the following manner. It is split, at approximately halfway along its length into two parts by septum 45 which extends up to the full height of the well casing forming forehearth 42 and chlorinating chamber 43. Over chamber 43 is provided fume hood system 46, and into chlorination chamber 43 is also provide lance ports 47. Metal is transferred from forehearth 42 defined by septum 45 into chlorination chamber 43 by metal pump 48, which is supported by brace 50, the delivery pipe 49 of which extends below the layer of flux in chlorination chamber 43. Thus, by means of pump 48, metal is drawn into forehearth 42 from the main melting chamber 31 and passed through chlorination chamber 43. Thus a continuous flow pattern is set up between these three parts of the furnace. For the small furnace described here, one pump was found sufficient; for larger furnaces several pumps may be found necessary.

Further, charging of metal can be permitted through access door 26, and it is feasible to modify both of the charging wells in this fashion.

Following are the data for this Example:

| | | |
|---|---|---|
| Metal charged to furnace: | pure (electrolytic) aluminum | |
| Furnace charge (no heel) | 19,500 kg. | |
| Magnesium added: | 100 kg. 0.51% kg. | |
| Pumping rate: | 680 kg./min. nominal | |
| Flux: | | |
| depth | 12 cm. approx. | |
| composition (parts by wt.) | NaCl:50 KCl:45 Na$_3$AlF$_6$:5 | |
| melting point | 660° C. | |
| Reaction time (both Cl$_2$ feed on and pump operating) | 165 mins. | |
| final magnesium content | 0.17% 33.1 kg. | |
| Hence: magnesium removed | 67 kg. | |
| Chlorine used | 200 kg. | |
| Theoretical chlorine | 198 kg. | |

At the end of this experiment analysis showed the flux layer to contain only 0.13 percent of aluminum chloride, while the magnesium chloride content had risen from zero initially to 15.9 percent (as MgCl$_2$).

EXAMPLE 6

Figure 5:
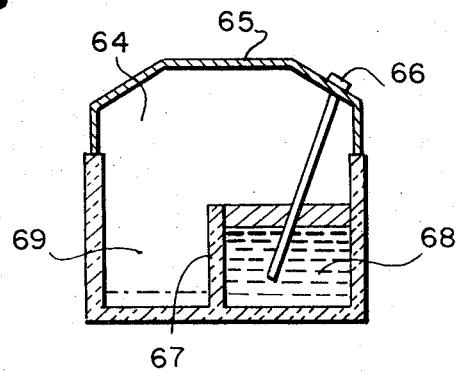
FIG. 5 is a sectional view taken along line 5—5 of FIG. 4.

In this Example a type of furnace as shown in FIGS. 4 and 5 was employed and is described as a further modification of the process which is operated continuously.

The incoming metal, which may be solid or molten, is fed into the well 60 of the heating chamber 61. The purpose of this chamber is, with solid metal, to melt it, and with molten metal to adjust its temperature to the 710°–750° C range desired for chlorination. The metal leaves the chamber and passes into the forehearth 62. The design of these three units is very similar to the furnace shown in FIG. 1, but generally the size in this case is very much smaller. The forehearth can also be used for dross removal; metal flows from it over the weir 63 into the chlorination chamber 64. Alternatively, a pump could be used between these two units as described in Example 4: this would have the advantage that, in the case of a solid metal feed, the flow rate through the chlorination stage would not be dependent on the melting rate, which is dependent upon a number of variables.

The chlorination chamber is provided with hood septum 65, through which one or more lances 66 can be inserted. As shown in FIG. 5, chamber 64 is split into two sub-chambers 68 and 69 along its length by the baffle 67. In sub-chamber 68, the chlorination is carried out, while sub-chamber 69 serves as a catch pot. During the chlorination, due to the formation of magnesium chloride, the quantity of flux increases. But it is not advisable to allow its depth to increase, as this will upset the metal levels in the chlorination chamber. Excess is allowed to spill over baffle 67 into sub-chamber 69. By provision of a suitable syphon system (not shown) sub-chamber or catch pot 69 can be made to empty itself periodically. This provision of a syphon provides opportunity to replenish the flux with raw materials and thus control its composition and melting point.

Chlorinated metal leaves the chamber 64 through the pair of weirs 70 and 71, which serve to retain dross and other insolubles and the flux; it can then be passed directly to whatever used is intended, for example, a casting machine.

In this example, molten metal was fed into the system furnace of FIGS. 4 and 5 from a ladle; the metal was passed directly to an ingot casting machine.

| | |
|---|---|
| Metal feed rate: | 3,640 kg./hr. at 680°–700° C. |
| Metal composition: | |
| Aluminum containing | 1.7% Magnesium |
| Chlorination temperature: adjusted | 710°–750° C. |
| Flux: | |
| initially (parts by weight) | KCl : 45 NaCl : 50 Na$_2$AlF$_6$ : 5 |
| melting point | 660° C. |
| Chlorine flow rate: | 180 kg./hour |
| Theoretical required | 172 kg./hour |
| Flux weight, rate of increase approx (removed by automatic syphon) | 230 kg./hour |
| Metal output composition: | |
| Aluminum containing | 0.1% Mg. |

The excess flux was periodically mixed with about 1/3 its weight of sodium chloride and returned, as a liquid via a lancehole, to the chlorination chamber.

EMBODIMENT IN WHICH FLUX CONTAINS AT LEAST PART OF CHLORIDIZING AGENT

In the preceding portion of this specification, details were set forth of the first embodiment of this invention under which a reactive chlorine-containing vapor is passed into the flux-covered metal to serve as the chloridizing agent. As was pointed out, however, it is within the contemplation of the present invention to utilize a flux which itself contains part or all of the chloridizing agent required to remove the impurities from the molten aluminum. The advantage of this latter embodiment is, of course, that the flux layer serves simultaneously to overcome the fume problem and to increase the efficiency of the process.

This embodiment of the present invention capitilizes on the second of the three criteria previously set forth for the flux utilized in the present invention: that the flux be capable of absorbing within itself at least the major part of any aluminum chloride formed during the chlorination. More specifically, it has now been discovered that by satisfying this second criterion through the use of a flux containing substantial amounts of aluminum chloride, then the flux can be used to provide a substantial part of the chlorine required for the reaction and to serve to overcome the fume problem noted above. Such substantial amounts of aluminum chloride are provided by utilizing a flux containing an aluminum chloride double salt.

As previously noted, a number of such double salts are known to exist, including by way of example $NaAlCl_4$, $KAlCl_4$, $LiAlCl_4$, $MgCl_2 \cdot 2AlCl_3$, $NH_4AlCl_4$, corresponding fluorides, and the like. However, it appears that the alkaline earth double chlorides are somewhat less reactive than the alkali double chlorides and, further, that the ammonium double salt is less stable; hence it is preferred to use a flux consisting primarily of the alkali metal chlorides, though all of the foregoing materials are useable. However, these particular double salts have extremely low melting points and therefore some "stiffening" of the flux may be desirable. This can be achieved in several ways. For example, a melt of the doublesalt $NaAlCl_4$ can be stiffened by addition of sodium chloride: the addition of only 5 percent (by weight) of sodium chloride raises the melting point from 158° C to approximately 600° C. Similarly, the addition of 2 percent cryolite, $Na_3AlF_6$, has about the same effect.

As noted in connection with the first embodiment described previously, these double salt fluxes can be prepared in a number of ways. The simplest method is to melt together the two salts in a suitable pot: details were given in Example 1 of the procedure for $NaAlCl_4$, which are typical. Alternatively, the fluxes can be made by an indirect route. More specifically, it was noted previously that chlorine gas and aluminum react very quickly to form aluminum chloride, and that a suitable flux will hold the aluminum chloride. Therefore a reactive flux can be made by simply chlorinating molten aluminum until the aluminum chloride level in the flux has risen to the desired level. A typical procedure was described in Example 2.

The contact between the metal and the flux can be achieved in several ways. The simplest form of the chlorination process is to use a furnace that is roughly a cube, and chlorine is fed directly into the molten metal by lances passing downwardly through suitable apertures in the walls above the molten metal. While this process can be operated more efficiently by simply providing a molten flux cover, this simple process is not amenable to the method of this invention, particularly if no chlorine gas at all is used. The difficulty is that agitation of the metal sufficiently well to achieve the necessary reaction between flux and metal is difficult to achieve.

However, if a modified form of furnace, as shown in FIG. 6 is used, then adequate contact between the molten flux and the metal can be achieved, as is described in Example 7. This form of furnace is also suitable for the form of this invention wherein both a chlorine containing flux and chlorine gas are used, as is described in Example 8. When operated in this manner, the process of this embodiment offers the advantage over the process of the first embodiment discussed previously in that the rate of feed of chlorine gas into the chlorination chamber generally does not match the rate of impurity removal: the gas flow rate is essentially constant, while the impurity level follows an exponential curve, tending toward zero magnesium content at infinite time. However, as soon as a desired amount of chlorine, has been added, gas flow can be stopped. Analysis shows that impurity removal will continue until the flux is depleted of reactive chlorine. Thus this form of the present invention offers a second advantage: the chlorination process is made controllable, and impurity removal down to a predetermined level, rather than completely, is practicable, at least in a batchwise process.

This simple cascade system can be made to operate as a continuous process provided steps are taken to keep the chloride content of the flux maintained at a suitable level. This can be done in several ways: for example by adding aluminum chloride, or by passing the depleted flux through a dross chlorination process. Although the metal flow through such a system has to be continuous, the flux flow need not: hence batchwise replenishment is feasible. Such a process is described in Example 9 and FIG. 7.

EXAMPLES 7 and 8

In both of these examples, the furnace 30' shown in FIG. 6 was used. This furnace is identical to that of FIGS. 2–3 except that pump 48' has a delivery pipe 49' which terminates above the flux layer 100'. Thus, any metal transferred from subchamber 42' into the chlorination chamber 43' must pass through the flux layer.

Following are the data from examples 7 and 8:

| Metal charged | Example 7<br>Aluminum<br>(pure electro<br>lytic) | Example 8<br>Aluminum<br>(pure electro<br>lytic) |
|---|---|---|
| Furnace charge | | |
| (no heel) | 19,500 kg. | 19,500 kg. |
| Magnesium added | 20 kg. | 100 kg. |
| | = 0.11% Mg. | = 0.51% Mg. |
| Flux: | | |
| basic composition | NaCl : 50 | NaCl : 50 |
| (part by weight) | KCl : 45 | KCl : 45 |
| | $Na_3AlF_6$ : 5 | $Na_3AlF_6$ : 5 |
| "$AlCl_3$a" content | | |
| initially | 13.6% | 2.4% |
| (wt. %) | | |
| Approx. | | |
| weight of flux | 700 kg. | 910 kg. |
| Chlorine added | Nil | 343 kg. |
| Pump flow rate | | |
| (approx.) | 680 kg./min. | 680 kg./min. |
| Reaction period | 120 mins | 165 mins |
| Chlorine added | | |
| during | Nil | 120 minutes |
| minutes | | from start of |
| | | pump |
| Magnesium content of | 0.06% | 0.17% |
| tapped metal | | |
| (wt. %) | | |
| "$AlCl_3$a" content | | |
| at end | 2.8% | 0.2% |
| (wt. %) | | |

EXAMPLE 9

Continuous Process of Chlorination

A continuous process of chlorination may be carried out in the apparatus of FIG. 7. The apparatus of FIG. 7 is identical to that of FIGS. 4 and 5 except for the provision of pump 53' which, as was the case in connection with the apparatus of FIG. 6, has a delivery pipe 54' which terminates above the flux layer 100'. As well as permitting contacting of the metal and flux, the use of pump 53 ensures constant flow conditions through the chlorinator, even though feed to the well 50 may be erratic, for example by periodic emptying of a ladle.

In the following example, molten metal was fed into one well 50' from a ladle; the output metal was passed directly to an extrusion billet casting machine.

| | |
|---|---|
| Metal feed rate: | 8,000 kg./hour |
| composition of feed: | Aluminum with 1.7% magnesium |
| composition of output: | Aluminum with less than 0.1% Mg. |
| temperature of feed metal: | 680°–700° C. |
| Chlorination temperature: | 710°–730° C. |

Initial composition of
flux (parts by weight):

|  |  |  |
|---|---|---|
| NaCl | 50 | melting point 660° C. |
| KCl | 45 | |
| Na$_3$AlF$_6$ | 5 | | to which had been added 12.7 percent AlCl$_3$ obtained by chlorination over molten metal.

| Operating flux depth: | 15–20 cm. |
|---|---|
| Chlorine flux rate: | 40 kg./hour |
| Flux weight increase: | 51 kg./hour |

Excess flux was removed from the catchpot by means of a syphon, reloaded with aluminum chloride and returned to the chlorinator. During flux return, chlorine gas feed was temporarily shut off but metal flow was maintained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a process for removing impurities from molten aluminum by treatment with a chlorine containing vapor to form a chloride from said impurity wherein the improvement comprises
   a. initially covering the molten aluminum with a molten flux layer of at least one salt selected from the group consisting of alkali metal chlorides, alkaline-earth metal chlorides, ammonium chloride, alkali metal fluorides, alkaline-earth metal fluorides and ammonium fluoride,
   b. contacting said molten aluminum while under said flux layer with a chlorine containing vapor to form aluminum chloride and chlorides of said impurities,
   c. maintaining a sufficient depth of said salt as a molten flux layer during treatment with said chlorine containing vapor so that chlorides formed during said treatment are absorbed by said flux layer thereby reducing the emission of fumes caused by the treatment with said chlorine containing vapor, and
   d. utilizing the aluminum chloride absorbed by said flux layer as a chloridizing agent for removing further impurities from the molten aluminum as the process continues.

2. The process as set forth in claim 1 wherein the molten aluminum is initially covered with a molten flux layer of sodium chloride.

3. The process as set forth in claim 1 wherein the molten aluminum is initially covered with a molten flux layer of potassium chloride.

4. The process as set forth in claim 1 wherein the molten aluminum is initially covered with a molten flux layer of a mixture of sodium chloride and potassium chloride.

5. The process as set forth in claim 1 in which said aluminum contains magnesium as an impurity and wherein the feed rate of the chlorine containing vapor is maintained to react with the magnesium and form magnesium chloride and wherein the resulting magnesium chloride is absorbed by said flux layer.

6. In a process for removing impurities from molten aluminum by treatment with a chloridizing agent wherein the improvement comprises
   a. forming a flux by fusing at least one salt selected from the group consisting of alkali metal chlorides, alkaline-earth metal chlorides, ammonium chloride, alkali metal fluorides, alkaline-earth metal fluorides and ammonium fluoride, with at least one salt selected from the group consisting of aluminum chloride and aluminum fluoride to form an aluminum halide double salt and including in said flux at least one single salt selected from the group consisting of alkali metal chlorides, alkaline-earth metal chlorides, ammonium chloride, alkali metal fluorides, alkaline-earth metal fluorides and ammonium fluoride,
   b. covering said molten aluminum with said flux as a molten layer, and
   c. utilizing the double halide salt portion of said molten flux layer as the chloridizing agent in said process.

7. The process as set forth in claim 6 wherein the molten aluminum is covered with a molten flux layer containing sodium aluminum chloride and a single salt selected from the group consisting of sodium chloride and potassium chloride.

8. The process as set forth in claim 6 wherein the molten aluminum is covered with a molten flux layer containing potassium aluminum chloride and a single salt selected from the group of sodium chloride and potassium chloride.

9. The process as set forth in claim 6 including the additional step of providing at least a portion of the quantity of chloridizing agent required to remove said impurities from said aluminum by introducing a chlorine containing vapor into the molten aluminum.

10. In a process for removing impurities from molten aluminum by treatment with a chloridizing agent wherein the improvement comprises covering the molten aluminum with a molten flux layer comprising an aluminum chloride double salt and at least one single salt selected from the group consisting of alkali metal chlorides, alkaline-earth metal chlorides, ammonium chloride, alkali metal fluorides, alkaline-earth metal fluorides and ammonium fluoride to suppress the emission of fumes caused by the treatment with said chloridizing agent.

11. A process as defined in claim 10 wherein said flux contains at least a portion of the quantity of chloridizing agent required to remove said impurities from said aluminum.

12. A process as defined in claim 11 further comprising providing at least a portion of the quantity of chloridizing agent required to remove said impurities from said aluminum by introducing a reactive chlorine-containing vapor into the molten aluminum.

13. A process as defined in claim 12 in which the molten aluminum contains magnesium as an impurity.

14. A process as defined in claim 10 in which the double salt portion of said flux is a double salt of AlCl$_3$ and a member selected from the group consisting of alkali metal chlorides, alkaline-earth metal chlorides and ammonium chloride.

15. A process as defined in claim 10 wherein said double salt portion of said flux is selected from a member of the group consisting of Na$_3$AlCl$_6$, NaAlCl$_4$, KAlCl$_4$, LiAlCl$_4$, MgCl$_2$·2AlCl$_3$ and NH$_4$AlCl$_4$.

* * * * *